United States Patent [19]

De Haan et al.

[11] Patent Number: 4,641,798

[45] Date of Patent: Feb. 10, 1987

[54] SYSTEM FOR RETAINING OR RELEASING SPACECRAFT SOLAR PANELS

[75] Inventors: Frans W. De Haan, De Hoef; Jan Wynia, Espel; Rob Zwanenburg, Alphen A.D. Rijn, all of Netherlands

[73] Assignee: Fokker B.V., Netherlands

[21] Appl. No.: 698,620

[22] Filed: Feb. 6, 1985

[30] Foreign Application Priority Data

Feb. 6, 1984 [NL] Netherlands .................... 8400362

[51] Int. Cl.$^4$ .............................................. B64G 1/44
[52] U.S. Cl. .................................... 244/173; 410/32; 403/322; 403/328
[58] Field of Search ............. 244/173, 137 R; 410/31, 410/32, 34, 52, 77; 403/328, 322, 325, 330; 292/64, 111; 24/514, 569, 115 G, 132 AA, 134 L; 160/213

[56] References Cited

U.S. PATENT DOCUMENTS

| | | | |
|---|---|---|---|
| 3,627,585 | 12/1985 | Dollery et al. | 244/173 |
| 4,015,653 | 4/1977 | Slysh et al. | 244/173 |
| 4,347,023 | 8/1982 | Rizos | 255/173 |
| 4,419,033 | 12/1983 | Roth et al. | 244/173 |
| 4,491,446 | 1/1985 | Ewald | 244/173 |

FOREIGN PATENT DOCUMENTS

| | | | |
|---|---|---|---|
| 3106099 | 10/1982 | Fed. Rep. of Germany | 244/173 |
| 3215432 | 10/1983 | Fed. Rep. of Germany | 244/173 |

Primary Examiner—Galen Barefoot
Assistant Examiner—Lynn M. Fiorito
Attorney, Agent, or Firm—Handal & Morofsky

[57] ABSTRACT

System for retaining or releasing a number of panels piled onto a supporting structure, such as solar panels of a spacecraft which can be deployed from the piled condition and retracted. The panels each comprise a number of passages at a distance of the edge defining a number of channels through the piled panels. A retainer extending through each channel, comprises operating elements at one side connected to control means attached to the supporting structure and at the other side connected to one or more seizing elements, which under control of said control means and through said operating elements can be moved from a retaining condition in which they seize the outer panel of the pile to a releasing condition in which they do not obstruct the deployment of the panels. After refolding the panels into a pile adjacent to the supporting structure the seizing elements can be moved by proper functioning of the control means and through said operating elments from the releasing condition into the retaining condition.

9 Claims, 5 Drawing Figures

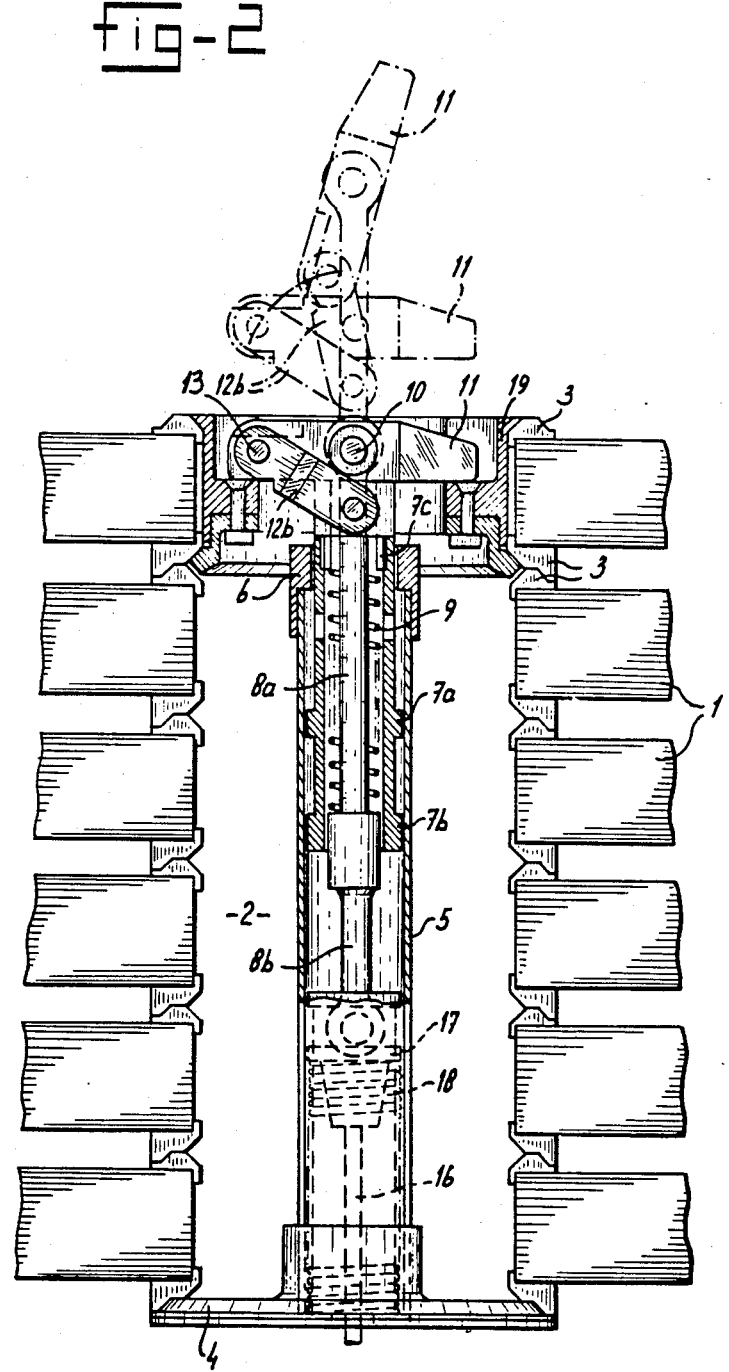

SYSTEM FOR RETAINING OR RELEASING SPACECRAFT SOLAR PANELS

The invention relates to a system for retaining or releasing a number of panels piled onto a supporting structure, such as solar panels of a spacecraft which are mutually pivotably zigzag wise connected, and can be deployed from the piled condition, which panels each comprise a number of passages at a distance of the edge defining a number of channels through the piled panels, the system comprising one or more retainers each extending through one of said channels, each retainer comprising operating elements at one side connected to control means attached to the supporting structure and at the other side connected to one or more seizing elements, which under control of said control means and through said operating elements can be moved from a retaining condition in which they seize the outer panel of the pile to a releasing condition in which they do not obstruct the movement of the panels in relation to the supporting structure.

In spacecrafts, comprising pivotably connected solar panels, it is up to now known to employ retainers to maintain the panels during transport to the space clamped against a wall of the spacecraft to avoid that acceleration forces and vibrations, occurring during said transport, will lead to not allowable movements between the panels or vibrations within said panels which may cause damage.

Retainers for solar panels are e.g. known from the Dutch laid open patent application No. 82.00800. Said known retainer is destined to seize the edge of a pile of panels, which pile by a number of said retainers, distributed along the circumference, is clamped against the supporting structure. This arrangement however is not suitable to suppress vibrations which may occur in the plane of a pannel during transport, which vibrations on the one hand may cause the adjoining panel surfaces of the solar cells to touch each other or may cause structural damage of the panels. To avoid said undesirable movements it is in general possible to incorporate a number of separate constructional elements, not only on the edges of the panels but also in the plane of the solar panel itself, such that the adjacent panels are mutually more or less connected through said constructional elements.

Therefore various proposals are made to embody and arrange the system for retaining or releasing the panels such that in the retaining situation the individual specific frequency of said panels, taking into account the design criteria with respect to the desired individual specific frequencies of the various parts of the satellite, is sufficiently large, and that furthermore the vibrations within a panel are decreased as result of the selection of the points which are now functioning as retaining points, whereas furthermore one can take advantage of the larger freedom (than in the case in which solely the panel edges are retained) in the choice of positions of the points, in which the panels are retained.

One of said proposals is described in the French Pat. No. 2.443.383. The retainer system described therein is of the type described in the heading part of this description. A disadvantage of this system is the restriction to use only during a deployment operation.

Refolding and again retaining the panels will also be conceivable thanks to the coming of transport vehicles which are suitable for recovering spacecrafts and satellites out of space such as the "Space Shuttle".

None of the prior art systems is suitable to be used during refolding operations. An object of the invention is therefor to provide a system which is applicable both during deployment operations as well as during refolding operations.

In agreement with said object the invention now provides a system of the type indicated in the heading part of this description characterized in that after refolding the panels into a pile adjacent to the supporting structure the seizing elements can be moved by proper functioning of the control means and through said operating elements from the releasing condition into the retaining condition.

A problem, which may arise in such systems, will present itself during the last phase of the refolding movement, when the panels have reached almost the end situation in which they are arranged directly against each other. In many cases the mechanisms for moving the panels will not or not in a sufficient way be able to assure the complete refolding movement of said panels.

A preferred embodiment of the system according to the invention allows assisting of the retracting mechanism of the panels in the last phase of the retracting movement. Said preferred embodiment of the system is in that respect characterized in that the seizing elements are in their retaining condition in longitudinal direction of the channels movable over a predetermined distance. Therewith it is possible that the seizing elements are brought to an extended position, moved into the retaining condition and in that condition catch the outer panel of a pile and thereafter retract the panels against the wall of the spacecraft during the further retracting movement.

The invention provides a further preferred embodiment of the retainer for use in a system of the above indicated type comprising a pivotable retaining lug, of which one end in the retaining condition presses against the outer panel of said panels, as well as operating means for pivoting said retaining lug between a retaining condition and a releasing condition, which system is according to the invention characterized in that the operating means comprise a tubular element of which the end determines a stop face for the retaining lug in the retaining condition, an operating rod extending through said tubular element and of which one end is pivotably connected to a central part of the retaining lug, the other end of said lug being pivotably connected to one end of a connecting rod of which the other end is pivotably connected to said tubular element, that the tubular element in the proximity of said stop face comprises an inner stopcollar arresting one end of a compression spring, the other end of which is arrested by a collar round the operating rod, which spring tries to maintain the retaining lug in the retaining condition, that said tubular element is arranged within in a cylinder and is movable therein between a position in which the retaining lug in the retaining condition makes contact with the piled panels and another position determined by arresting means, in which other position the retaining lug is in the retaining condition at some distance of the piled panels, that a second compression spring, with higher elastic force than said first compression spring is arranged between inner stop means within the cylinder and a collar round the operating rod, which spring is able to move the combination of tubular elements and the operating rod to said other position and thereafter move the operating rods against the spring force of said first compression spring further such that the retaining lug is brought into the releasing condition. By first moving the retaining lug in the retaining condition away from the panels and thereafter, at some distance of the upper panel, carrying out the pivoting movement of said lug, a uniform grip is obtained over the complete surface, seized by said lug, and furthermore both during the retaining resp. the releasing movements no local overpressure will occur. Furthermore the retainer according to the invention comprises less parts and less pivotable connections than the prior art retainer.

A further embodiment of the retainer for use in a system according to the invention is characterized in that the seizing elements of the retainer comprise at least one lever element attached by means of a pivot shaft to the end of an operating rod and provided with a first lever arm carrying a hook element at the end thereof and extending approximately in longitudinal direction through the respective channel and provided with a second lever arm extending approximately in transversal direction in said channel, said pivot shaft being slidably guided into elongated slits in opposed supporting plate elements extending in longitudinal direction within said channel such; that by moving said end of the operating rod under control of the control means in the one direction through said channel the lever element will be moved in the same direction until the second lever arm is arrested by stop means connected to said supporting plate element(s), whereafter further movement of said operating rod end will result into a pivoting movement of the lever element around said pivot shaft such that the hook element is moved to the central part of the channel out of reach of the outer panel, whereas moving of said end of the operating rod in the opposite direction will cause an inverse movement of the lever element.

The invention will now be explained in more detail with reference to the attached drawings.

FIG. 2 illustrates a longitudinal cross-section through a retainer according to the invention. With full lines the retainer is illustrated in the retaining condition, and with dash-and-dot-lines parts of the retainer are indicated in an intermediate position in which the retaining lug is moved away from the upper panel and from which it can be brought into the releasing condition.

Figure 1:
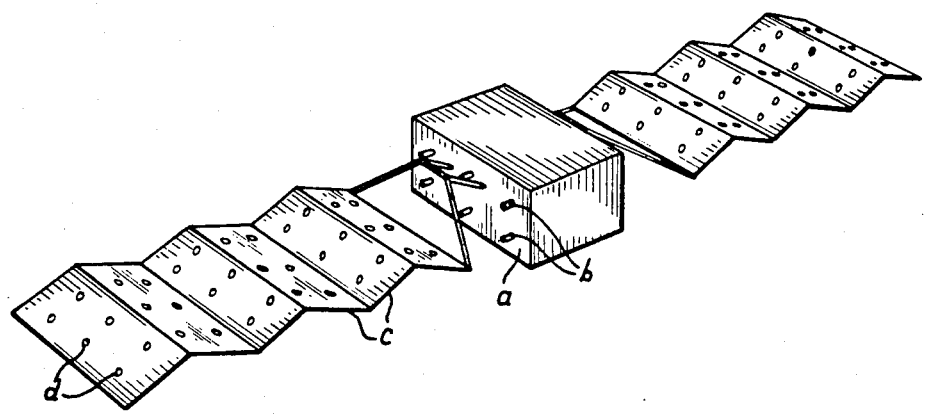
FIG. 1 illustrates schematically a satellite with partly defolded solar panels.

In FIG. 1 a satellite is illustrated with partly defolded solar panels at both sides. Onto the supporting wall a of the satellite a number of retainers b are visible and each of the panels c comprises a corresponding number of passages d of such dimensions that the seizing elements of the retainers in their releasing condition do not hamper the deploying or refolding movement of the zigzag wise connected solar panels by means of the thereto destined driving and guiding mechanisms. Such mechanisms do not form part of the invention.

The location of the retainers is selected such that vibrations which might occur in the panels themselves will be suppressed effectively.

Figure 3:
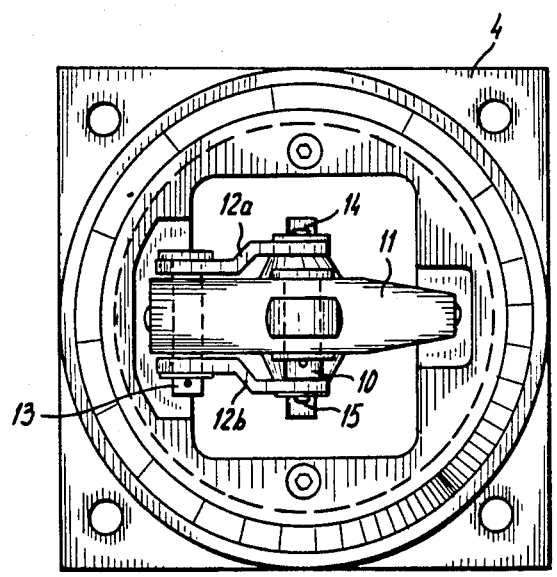
FIG. 3 illustrates an upper view of the retainer according to the invention.

In the FIGS. 2 and 3 part of a pile of panels 1 is visible. The panels comprise passages 2 with adjusting elements 3 by means of which they are piled on top of each other. A retainer extends through said passages, which retainer comprises a base section 4 connected to the wall of the spacecraft underneath said passages. A cylinder 5, of which the upper end is closed by a cup 6 with a central passage therein, is fixed within the base section 4. A tubular element 7 is located within the cylinder 5 and said tubular element is by means of the rings 7a and 7b movable in longitudinal direction within said cylinder 5. An operating rod 8, comprising two sections 8a and 8b, extends through said tubular element 7. The upper end of section 8b forms a collar arresting the compression spring 9. The other end of the compression spring 9 is arrested by inwards extending parts 7c of the tubular element 7. The upper end of the operating rod 8a comprises an eye section and through a pivotshaft 10, running through said eye section, the upper end of the operating rod is pivotably connected to the retaining lug 11. Two coupling strips 12a and 12b are by means of the pivotshaft 13 and the pivotconnections 14 and 15 on the one hand coupled to the end of the retaining lug 11 and on the other hand coupled to the upper end of the tubular element 7.

A cable 16 is attached to the lower end of the operating rod 8b through a coupling element 17 which also functions as arresting element for the compression spring 18, of which the other end is arrested against a collar in the base section 4.

When the cable 16 is paid out, then the compression spring 18 will move the combination of the tubular element 7 and the operating rod 8 upwards until the ring 7a is arrested by the shoulder of the cup 6. The then reached intermediate position is in FIG. 2 schematically indicated by dash-and-dot-lines. By further paying out the cable 16 the compression spring 18, which is stronger than the spring 9 will force the operating rod 8a, 8b upwards so that the central part of the retaining lug 10 will be moved upwards resulting in a pivoting movement to an end position which is indicated in the Figures by means of dash-and-dotlines.

When the cable 16 is retracted then first of all the retaining lug will move back from the upper position, illustrated in the Figure with dash-and-dot-lines to the similarly illustrated intermediate position and thereafter the then prepared retaining lug will in combination with the other elements move downwards until contact is made with the extending stop elements 19 and 20, attached to the upper panel 1.

In an embodiment with a spring tensioned cable lock system of the type, to which was referred above, the cable may end at the outer panel without the necessity that said panel should have a passage. In that case only the remaining panels should have said abovementioned passages.

In another embodiment a combination of cables may end at the outer panel and other cables may end at intermediate panels to obtain a stepwise deployment of the solar panels. However, a comparable result can be obtained by a mechanical telescopical system of the above indicated type, which in that case may comprise a number of intermediate seizing elements. If cables are used then said cables can be of the rupturable type, in which case a cutting mechanism or e.g. a releasing mechanism as described in the Dutch patent application No. 83.00788 can be used, or, in case the panel should be refoldable, it should be possible to pay out or retract the cables.

Figure 4:
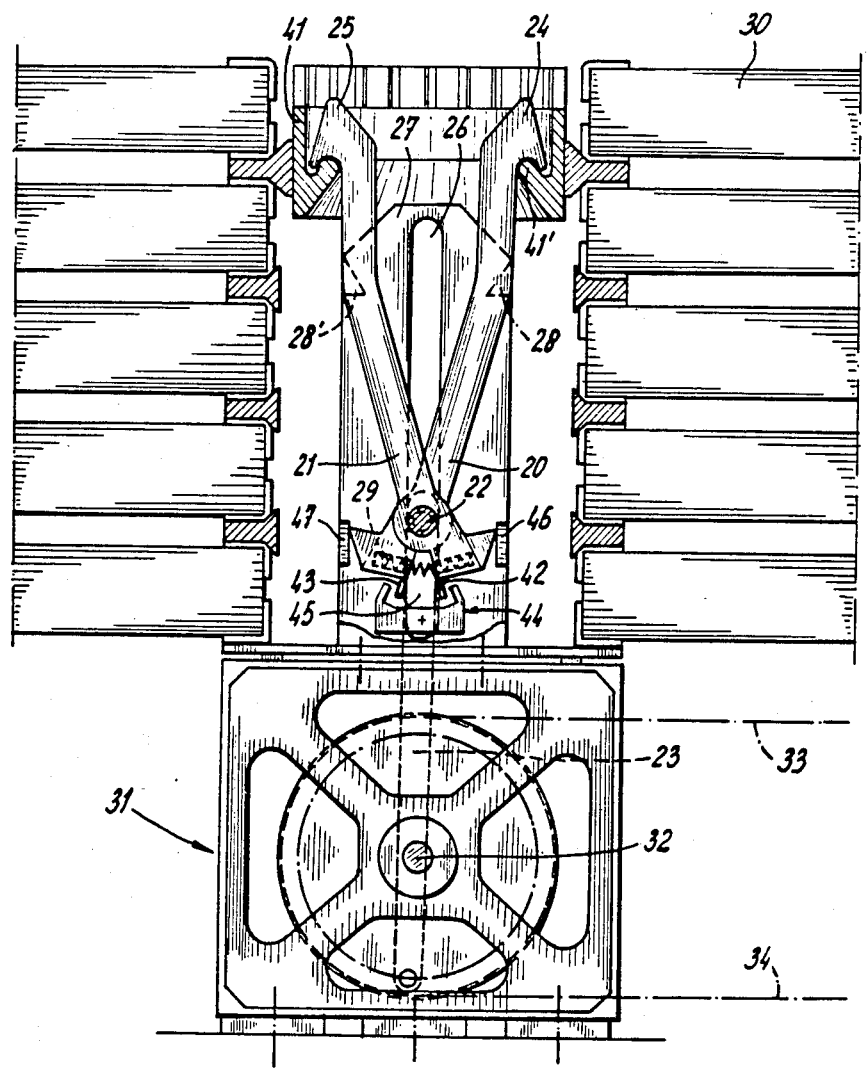
FIG. 4 shows a further embodiment of the retainer according to the invention.

FIG. 4 illustrates a further embodiment of a retainer for use in a system according to the invention. The seizing elements of the retainer comprise at least two lever elements 20 and 21 attached by means of a pivot shaft 22 to the end of an operating rod 23 and provided with a first lever arm carrying a hook element 24, 25 respectively at the end thereof and extending approximately in longitudinal direction through the respective channel and provided with a second lever arm extending approximately in transversal direction in said channel. The pivot shaft 22 is slidably guided into elongated slits 26 in opposed supporting plate elements, one of which is illustrated in the figure indicated by 27, extending in longitudinal direction within said channel such, that by moving said end of the operating rod under control of the control means in the one direction through said channel the lever elements will be moved in the same direction until the end of both second lever arms is arrested by stop means 28, 28' in the form of transversal bars or similar elements connected to one or both said supporting plate elements 27. Thereafter further movement of said operating rod end will result into a pivoting movement of the lever elements 20 and 21 around said pivot shaft 22 such that the hook elements are moved to the central part of the channel out of reach of the collar 41 of the outer panel 30 which was in the situation illustrated in FIG. 4 seized by said hook elements 24 and 25. The ultimate position reached at the end of this releasing movement is illustrated in FIG. 5.

Figure 5:
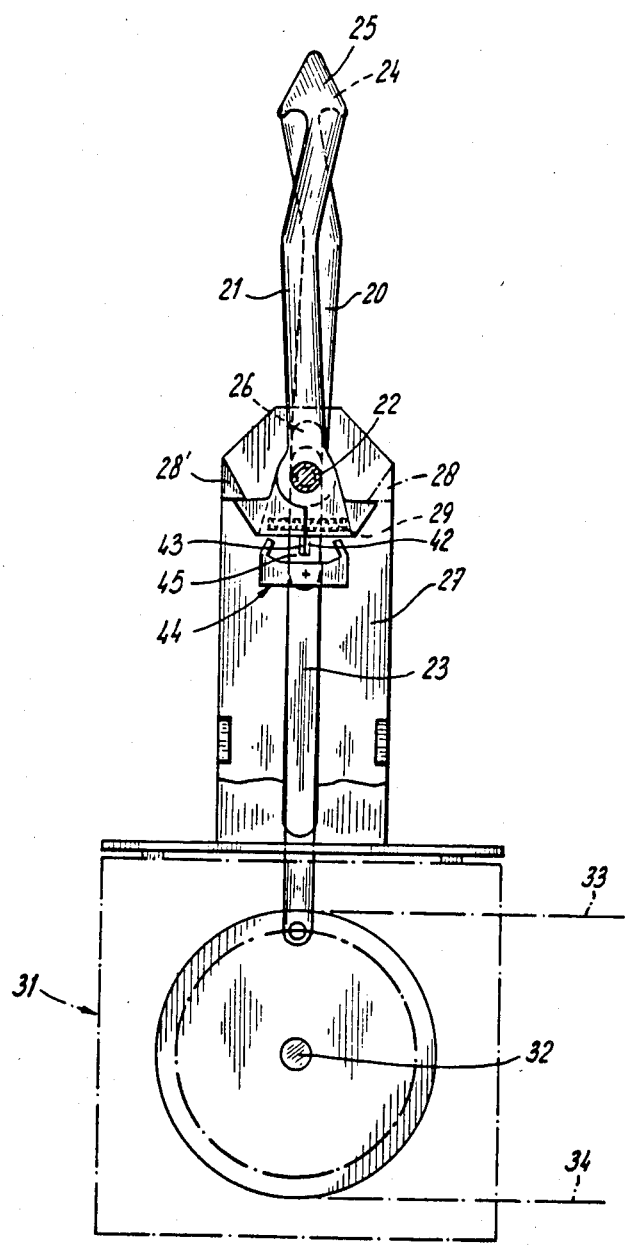
FIG. 5 shows a side view of the embodiment of FIG. 4.

Moving said operating rod 23 in the opposite direction will cause an inverse movement of the lever elements from the position illustrated in FIG. 5 to the position illustrated in FIG. 4.

At least one spring element 29 is arranged between both second lever arms such that both ends of said second lever arms are biased to force the hook elements 24, 25 of both first lever arms in the direction of the adjacent part of the outer panel 30. For securing said spring 29 both second lever arms have parts extending perpendicular to the plane of the drawing and comprising blind holes opposite of each other each receiving one end of the spring 29. Furthermore both second lever arms have further downwards extending pinsections 42 and 43 positioned into an excavation determined by a further component 44 for limiting the movement of the lever elements under the influence of said spring 29. Said component 44 is attached to one end of an arm 45, the other end is connected to the pivot shaft 22. Said arm 45 is movable within the slits 26 of the supporting plate element 27 preventing thereby an other movement of the component 44 then only in the direction of said slits.

As is illustrated in FIG. 4 the supporting plate elements 27 carry further extending elements 46 and 47 in the form of bars or rods causing under the influence of the lever action a slight movement of both hook elements 24 and 25 towards each other at the end of the retracting movement establishing thereby a firm grip of both hook elements on the inner edge 41' of the collar 41.

The other end of the operating rod 23 is rotatably connected to a crank-shaft mechanism indicated in general by 31, which mechanism is rotatable around a central axis 32 in the one direction by pulling a deployment cable 33 and in the opposite direction by pulling a retraction cable 34 such that rotation over approximately 180° in the one direction will cause movement of the operating rod in the one direction whereas rotation over ±180° in the other direction will cause movement of the operating rod 23 in the other direction.

I claim:

1. A system for retaining or releasing a number of relatively flat panels piled onto a supporting structure such as solar panels or a spacecraft which are mutually pivotably zigzag wise connected and can be deployed from the piled condition to an unfolded condition and can be refolded from the unfolded condition into the piled condition, which panels each comprise a number of passages at a distance of the side edges of each panel defining a number of channels through the piled panels, the system comprising one or more retainers each attached to the supporting structure and extending through one of said channels, each retainer comprising operating elements coupled to control means attached to the supporting structure and coupled to one or more seizing elements which under control of said control means and through said operating elements can be moved telescopically in the direction of said channels away from the panels over a predetermined distance and can thereafter be brought from a retaining condition, in which they seize the outer panel of the pile, to a releasing condition in which they do not obstruct the deploying movement of the panels in relation to the supporting structure, which seizing elements after refolding the panels into a pile adjacent to the supporting structure and through proper functioning of the control means and through said operating elements can be brought from the releasing condition into the retaining condition and thereafter can be moved telescopically in the channel direction over said predetermined distance towards said panels.

2. The system of claim 1 in combination with a spacecraft comprising a number of pivotably mutually connected solar panels which from a piled position can be deployed and thereafter can be refolded, which solar panels each comprise a number of passages which in the piled condition define a number of channels.

3. A system for retaining or releasing a number of relatively flat panels piled onto a supporting structure such as solar panels or a spacecraft which are mutually pivotably zigzag wise connected and can be deployed from the piled condition to an unfolded condition and can be refolded from the unfolded condition into the piled condition, which panels each comprise a number of passages at a distance of the side edges of each panel defining a number of channels through the piled panels, the system comprising one or more retainers each attached to the supporting structure and extending through one of said channels, each retainer comprising operating elements coupled to control means attached to the supporting structure and coupled to one or more seizing elements which under control of said control means and through said operating elements can be moved telescopically in the direction of said channels away from the panels over a predetermined distance and can thereafter be brought from a retaining condition, in which they seize the outer panel of the pile, to a releasing condition in which they do not obstruct the deploying movement of the panels in relation to the supporting structure, which seizing elements after refolding the panels into a pile adjacent to the supporting structure and through proper functioning of the control means and through said operating elements can be brought from the releasing condition into the retaining condition, wherein the seizing elements comprise a retaining lug comprising a central and two end parts, said central part is pivotably connected to said operating elements, said one end part is pivotably connected to one end of a linkage element, the other end part is pivotably connected to a part of the retainer which is not movable in relation to the operating elements, which retaining lug in the retaining condition presses with at least the other end part onto the outer panel and can pivotably move to the releasing condition by movement of the operating elements under the influence of the control means.

4. System according to claim 3, characterized in that the system comprises furthermore a tubular element of which one end determines a stopface for said retaining lug in the retaining condition, and an operating rod extending through said tubular element and of which one end is pivotably connected to the central part of the retaining lug, that the other end of said linkage element is pivotably connected to this tubular element, that the tubular element in the proximity of said stopface comprises an inner stopcollar arresting one end of a compression spring, the other end of which is arrested by a collar round the operating rod, which spring tries to maintain the retaining lug in the retaining condition, that said tubular element is arranged within a cylinder and is movable therein between a position in which the retaining lug in the retaining condition makes contact with the piled panels and another position determined by arresting means, in which other position the retaining lug is in the retaining condition at some distance of the piled panels, that a second compression spring, with higher elastic force than said first compression spring is arranged between inner stop means within the cylinder and a collar round the operating rod, which spring is able to move the combination of tubular element and operating rod to said other position and thereafter move the operating rod against the springforce of said first compression spring further such that the retaining lug is brought into the releasing condition.

5. A system for retaining or releasing a number of relatively flat panels piled onto a supporting structure such as solar panels or a spacecraft which are mutually pivotably zigzag wise connected and can be deployed from the piled condition to an unfolded condition and can be refolded from the unfolded condition into the piled condition, which panels each comprise a number of passages at a distance of the side edges of each panel defining a number of channels through the piled panels, the system comprising one or more retainers each attached to the supporting structrue and extending through one of said channels, each retainer comprising operating elements coupled to control means attached to the supporting structure and coupled to one or more seizing elements which under control of said control means and through said operating elements can be moved telescopically in the direction of said channels away from the panels over a predetermined distance and can thereafter be brought from a retaining condition, in which they seize the outer panel of the pile, to a releasing condition in which they do not obstruct the deploying movement of the panels in relation to the supporting structure, which seizing elements after refolding the panels into a pile adjacent to the supporting structure and through proper functioning of the control means and through said operating elements can be brought from the releasing condition into the retaining condition, wherein the seizing elements of the retainer comprise at least one lever element attached by means of a pivot shaft to one end of an operating rod and provided with a first lever arm carrying a hook element at the end thereof and extending approximately in longitudinal direction through the respective channel and provided with a second lever arm extending approximately in transversal direction in said channel, said pivot shaft being slidably guided into elongated slits in opposed supporting plate elements extending in longitudinal direction within said channel such, that by moving said end of the operating rod under control of the control means in the one direction through said channel the lever element will be moved in the same direction until the second lever arm is arrested by stop means connected to said supporting plate elements, whereafter further movement of said operating rod end will result into a pivoting movement of the lever element around said pivot shaft such that the hook element is moved to the central part of the channel out of reach of the outer panel, whereas moving of said end of the operating rod in the opposite direction will cause an inverse movement of the lever element.

6. Retainer according to claim 5, characterized in that said retainer comprises two lever elements of the described type mutually arranged such that both hook elements are seizing the outer panel in opposite directions in relation to the central axis of the channel.

7. Retainer according to claim 6, characterized by at least one spring element arranged between both second lever arms such that both ends of said second lever arms are biased to force the hook elements of both first lever arms in the direction of the adjacent part of the outer panel.

8. System according to claim 5, characterized in that the connection between the operating elements and the control elements, which are attached to the supporting structure, is realized by means of cables.

9. System according to claim 8, characterized in that the other end of the operating rod is rotatably connected to a crank-shaft mechanism, which mechanism is rotatable around a central axis in a first one direction by pulling a deployment cable and in the opposite direction by pulling a retraction cable such that rotation over approximately 180° in the first direction will cause movement of said operating rod in the one direction whereas rotation over 180° in opposite direction will cause movement of the operating rod in an opposite direction.

* * * * *